(12) United States Patent
Rival et al.

(10) Patent No.: US 11,270,857 B2
(45) Date of Patent: Mar. 8, 2022

(54) ELECTRIC SWITCHING UNIT COMPRISING A FILTERING DEVICE

(71) Applicant: Schneider Electric Industries SAS, Rueil Malmaison (FR)

(72) Inventors: Marc Rival, Bernin (FR); Cyril Domenech, Proveysieux (FR); Jean-Paul Gonnet, Fontaine (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 0 days.

(21) Appl. No.: 16/903,464

(22) Filed: Jun. 17, 2020

(65) Prior Publication Data

US 2020/0411263 A1 Dec. 31, 2020

(30) Foreign Application Priority Data

Jun. 26, 2019 (FR) ...................................... 1906952

(51) Int. Cl.
*H01H 9/34* (2006.01)
*H01H 33/53* (2006.01)
(Continued)

(52) U.S. Cl.
CPC ......... *H01H 33/72* (2013.01); *B01D 46/0019* (2013.01); *H01H 9/346* (2013.01);
(Continued)

(58) Field of Classification Search
CPC ........ H01H 33/72; H01H 33/74; H01H 33/53; H01H 33/62; H01H 33/08; H01H 9/346;
(Continued)

(56) References Cited

U.S. PATENT DOCUMENTS 3,621,169 A * 11/1971 Heft ...................... H01H 73/18
218/152
6,977,354 B1 12/2005 Shea et al.
(Continued)

FOREIGN PATENT DOCUMENTS

DE 102017207786 11/2018
EP 0437151 * 7/1991 ............... H01H 9/34

OTHER PUBLICATIONS

EP0437151 translation (Original document published Jul. 17, 1991) (Year: 1991).*

(Continued)

*Primary Examiner* — William A Bolton
(74) *Attorney, Agent, or Firm* — Locke Lord LLP

(57) ABSTRACT

An electric switching unit comprises a casing and a plurality of arc extinguishing chambers formed inside the casing, each arc extinguishing chamber comprising a gas discharge orifice opening to outside the casing. The electric switching unit comprises a filtering device positioned outside the casing and comprising: a plurality of inlet openings placed on a lower region of the filtering device, each one being configured to collaborate fluidically with one of the said gas discharge orifices; an outlet opening placed on a lateral region of the filtering device; a common internal chamber which places the inlet openings in fluidic communication with the outlet opening; and a filter located inside the internal chamber between the inlet openings and the outlet opening.

19 Claims, 4 Drawing Sheets

(51) Int. Cl.
  *H01H 33/72* (2006.01)
  *H01H 71/02* (2006.01)
  *B01D 46/00* (2006.01)

(52) U.S. Cl.
  CPC .......... *H01H 33/53* (2013.01); *H01H 71/025* (2013.01); *B01D 2267/00* (2013.01)

(58) Field of Classification Search
  CPC .. H01H 9/342; H01H 9/345; H01H 2009/343; H01H 2009/305; H01H 71/025; H01H 73/18; H01H 9/34; B01D 46/0019; B01D 46/0032; B01D 46/10; B01D 2267/00
  USPC ..... 218/1, 15, 34, 105, 157; 200/50.21, 264, 200/306, 307; 335/201
  See application file for complete search history.

(56) References Cited

U.S. PATENT DOCUMENTS

| | | | | |
|---|---|---|---|---|
| 7,368,679 | B2* | 5/2008 | Buxton | H01H 9/342 218/152 |
| 7,488,915 | B2* | 2/2009 | Pollitt | H01H 9/342 335/201 |
| 7,598,833 | B1* | 10/2009 | Hodges | H01H 9/342 218/149 |
| 7,910,845 | B2* | 3/2011 | Kozar | H02B 11/133 200/50.24 |
| 8,525,054 | B2* | 9/2013 | Pai | H01H 71/126 200/50.24 |
| 10,020,143 | B2* | 7/2018 | Rival | H01H 9/342 |
| 2012/0120558 | A1 | 5/2012 | Raabe et al. | |

OTHER PUBLICATIONS

English Language Machine Translation of German Patent Application Publication No. DE102017207786, published on Nov. 15, 2018, 18 pages.

Search Report and Written Opinion for French Patent Application No. FR1906952 dated Dec. 13, 2019, 6 pages.

\* cited by examiner

ELECTRIC SWITCHING UNIT COMPRISING A FILTERING DEVICE

TECHNICAL FIELD

The present invention relates to an electric switching unit comprising a filtering device.

BACKGROUND

In the field of electricity distribution, it is known to use electromechanical electric switching units, such as low-voltage multipolar circuit breakers, capable of interrupting a high-intensity electric current (for example currents greater than or equal to 630 amperes).

These units generally comprise filters intended to cool the extinguishing gases generated during the interruption of the electric current. For example, these filters are embedded in the arc extinguishing chambers of the unit. This makes it possible to treat the extinguishing gases before they are evacuated out of the unit in order to avoid causing damage to the surrounding installations.

Indeed, the extinguishing gases are generally electrically conductive when they are hot. If they are released out of the unit without being filtered or cooled, they are liable to present an electrical risk for the surrounding electrical installations.

Such units have been satisfactory for a long time. However, the needs of the market have led to the development of switching units with enhanced performance and with higher current ratings.

Consequently, the energy levels involved during the switching of the current are so much greater than in the known units that the known filters are no longer able to cool the extinguishing gases in a satisfactory manner, in particular due to the increase in the pressure and temperature of the extinguishing gases.

There is therefore a need for devices for filtering extinguishing gases having improved performance.

SUMMARY

One aspect of the invention relates to an electric switching unit comprising a casing and a plurality of arc extinguishing chambers formed inside the casing, each arc extinguishing chamber comprising a gas discharge orifice opening to outside the casing, the electric switching unit being characterized in that it comprises a filtering device positioned outside the casing and comprising:
- a plurality of inlet openings placed on a lower region of the filtering device, each inlet opening being configured to collaborate fluidically with one of said gas discharge orifices;
- an outlet opening placed on a lateral region of the filtering device;
- a common internal chamber which places the inlet openings in fluidic communication with the outlet opening;
- a filter located inside the internal chamber between the inlet openings and the outlet opening.

By virtue of the invention, the performance of the filtering device is improved relative to the known filters embedded in arc extinguishing chambers. In particular, the pressure of the extinguishing gases exiting from the discharge orifices is better balanced by virtue of the common internal chamber. The location of the filter in the chamber, and the lateral location of the outlet opening, extend the path followed by the gas streams and improve the effectiveness of the filter.

The lateral location of the outlet opening also makes it possible to orientate the exiting gas stream toward a specific area of the surroundings of the unit, in particular in order to avoid it striking neighbouring units adjoining the switching unit in an uncontrolled manner. The internal construction of the filtering device is facilitated in particular by the fact that it is located outside the casing of the switching unit.

According to advantageous but non-mandatory aspects, such an electric switching unit may incorporate one or more of the following features, taken alone or in any technically permissible combination:
- The filter has a planar shape and is inclined inside the internal chamber.
- The filter extends longitudinally from a first end in contact with a first lateral region of the filtering device to a second end in contact with the opposite lateral region in which the outlet opening is formed, the second end being located below the outlet opening.
- The angle of inclination of the filter is greater than or equal to 15°.
- The filter comprises one or more layers of a filtering material such as a porous material or a woven metal web or a metal foam.
- The ratio between, on the one hand, the section of the outlet opening and, on the other hand, the total section of the inlet openings, is greater than or equal to 0.5 and advantageously greater than or equal to 1.
- The filtering device comprises fixing devices for securing the filtering device to the casing of the unit.
- The switching unit comprises a chassis delimiting a receiving volume into which the casing is removably inserted, and the filtering device is fixed to the chassis facing the receiving volume.
- The filtering device has an elongate shape extending substantially along a longitudinal axis, such as a substantially rectangular shape or a substantially cylindrical shape.
- The filtering device comprises a body made from an electrically insulating material.

BRIEF DESCRIPTION OF THE DRAWINGS

The invention will be better understood and other advantages thereof will become more clearly apparent in light of the following description of one embodiment of an electric switching unit, provided solely by way of example and given with reference to the appended drawings, in which.

DETAILED DESCRIPTION

Figure 1:
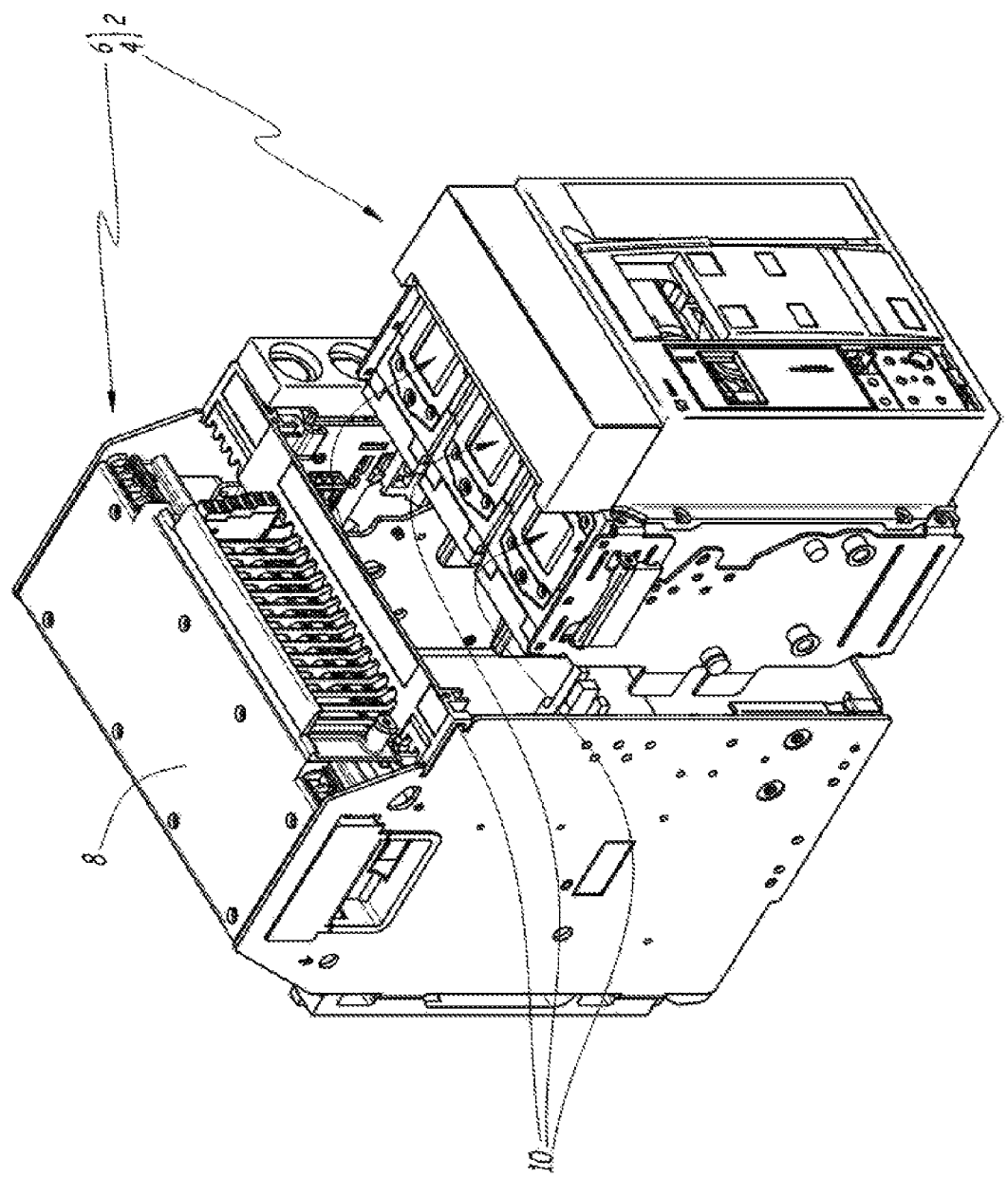
FIG. 1 is a schematic representation of an electric switching unit comprising a filtering device in accordance with embodiments of the invention.

FIG. 1 illustrates an embodiment of an electric switching unit 2 such as a low-voltage power circuit breaker. For example, the unit 2 is an air circuit breaker or a moulded-case circuit breaker.

These examples are not however necessarily limiting and, as a variant, the embodiments of the invention are applicable to other types of electric switching unit, such as switches, or more generally to any low-voltage electric switching unit with separable electrical contacts.

In this example, the rating of the circuit breaker (assigned current In) is greater than or equal to 630 amperes.

Preferably, the unit 2 is a multipolar device. In the example illustrated, the unit 2 comprises three poles so as to be able to interrupt a three-phase electric current. As a variant, the number of poles may be different, for example equal to four.

The unit 2 comprises a casing 4 and a plurality of arc extinguishing chambers formed inside the casing 4.

According to examples which are not necessarily limiting, the casing 4 is made from an electrically insulating material, such as a thermosetting plastic or a thermoplastic.

According to several embodiments, the casing 4 is divided into several polar compartments each containing an arc extinguishing chamber and a pair of separable electrical contacts associated with a phase of the electric current and connected to connection terminals of the unit 2.

Each arc extinguishing chamber is configured to extinguish an electric arc liable to appear between the electrical contacts when they are separated as the unit 2 switches to an electrically open state.

For example, each arc extinguishing chamber comprises arc extinction means, such as a stack of metal plates intended to split an electric arc.

Each arc extinguishing chamber also comprises a gas discharge orifice 10 which opens to outside the casing 4. Each discharge orifice 10 makes it possible to evacuate, to outside the casing 4, the extinguishing gases generated in the arc extinguishing chamber by the electric arc.

In practice, the rest of the casing 4 is advantageously sealed with respect to the extinguishing gases and the polar compartments are separated in a sealed manner from one another, so that the extinguishing gases may normally exit from the casing 4 only by passing through the discharge orifices 10.

For example, the discharge orifices 10 are formed in an upper region of the casing 4. According to one example given for illustrative purposes, when the casing 4 substantially has the shape of a slab with a rectangular base, the discharge orifices 10 may be situated in an upper face of the casing 4.

The unit 2 also comprises a filtering device 8, also called filtering cartridge, configured to filter the extinguishing gases exiting from the casing 4, in particular to cool and decontaminate these extinguishing gases before they are released into the surroundings of the unit 2.

The filtering device 8 is advantageously positioned outside the casing 4 and associated with the discharge orifices 10.

In the example of FIG. 1, the unit 2 is an unpluggable circuit breaker comprising a removable part formed by the casing 4 and a chassis 6 which delimits a receiving volume into which the casing 4 is removably inserted. For example, the chassis 6 is intended to be mounted on an electrical switchboard. The casing 4 is configured to be reversibly inserted into or removed from the chassis 6 by a translatory movement. Electrical connectors embedded in the chassis 6 and behind the casing 4 establish an electrical connection between the terminals of the unit 2 and the electrical switchboard when the casing 4 is inserted into the chassis 6.

Advantageously, the filtering device 8 is fixed to the chassis 6 facing the receiving volume, for example in an upper part of the chassis 6, so as to overhang and be in contact with the discharge orifices 10 when the mobile part 4 is inserted into the chassis 6.

For example, as illustrated in FIG. 1, the chassis 6 comprises two lateral walls located vertically on either side of the receiving volume and the filtering device 8 is fixed perpendicularly to these two lateral walls above the receiving volume.

However, the unit 2 is not necessarily unpluggable. In particular, according to variants which have not been illustrated, the chassis 6 is omitted and the unit 2 is configured so that the casing 4 may be mounted directly on an electrical switchboard. The embodiments of the filtering device 8 described below may be transposed to such units 2.

Figure 2:
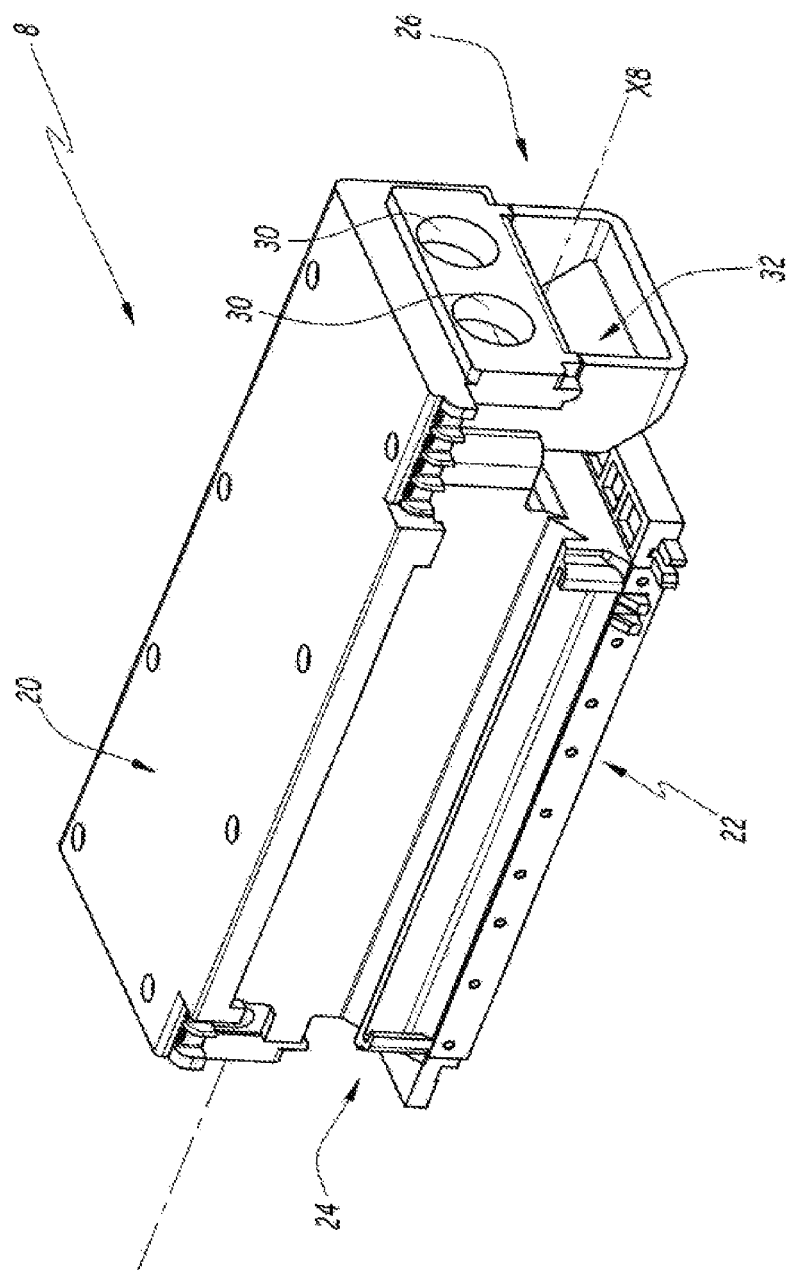
FIG. 2 is a schematic representation of a filtering device in accordance with embodiments of the invention.
Figure 3:
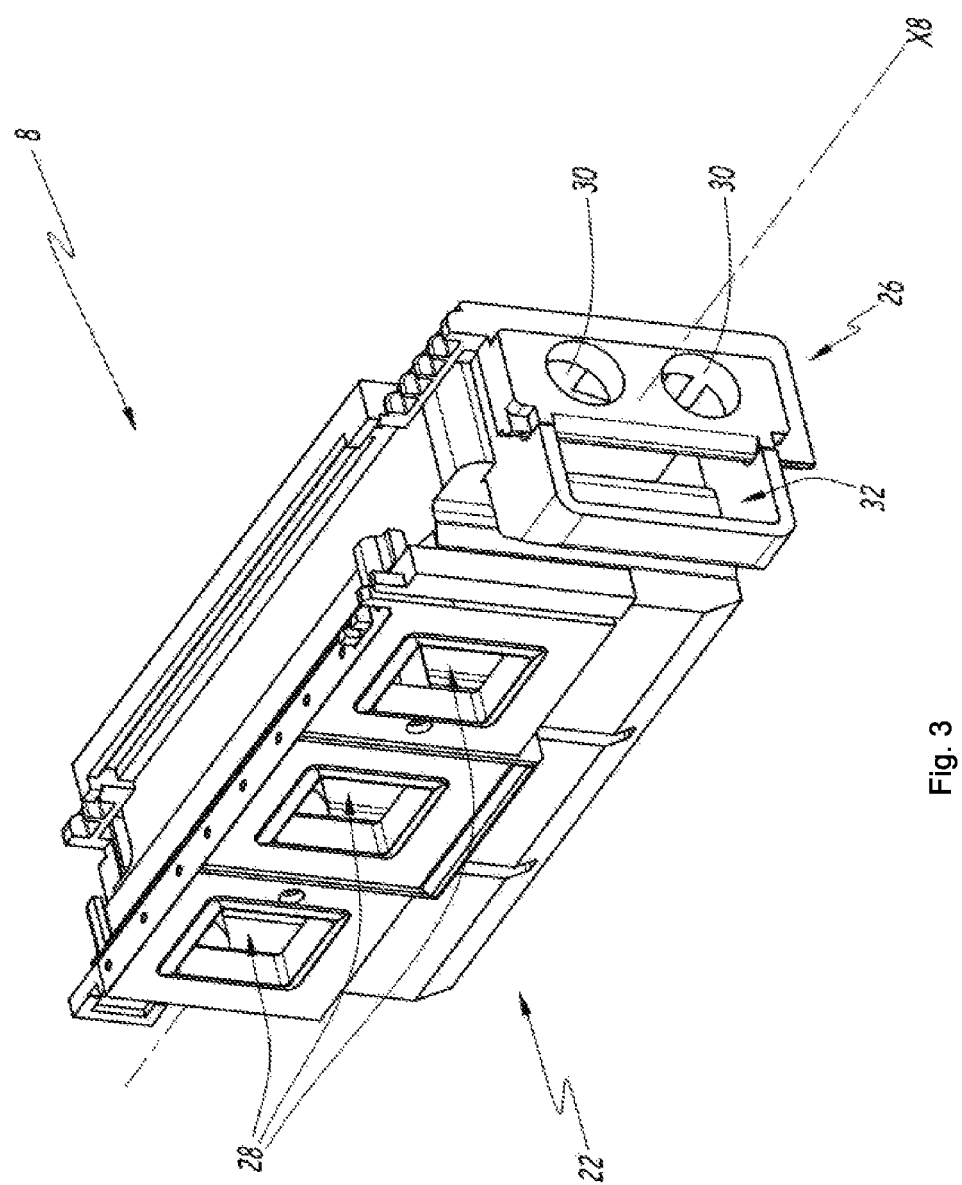
FIG. 3 is a schematic representation of the filtering device of FIG. 2 in a different orientation.
Figure 4:
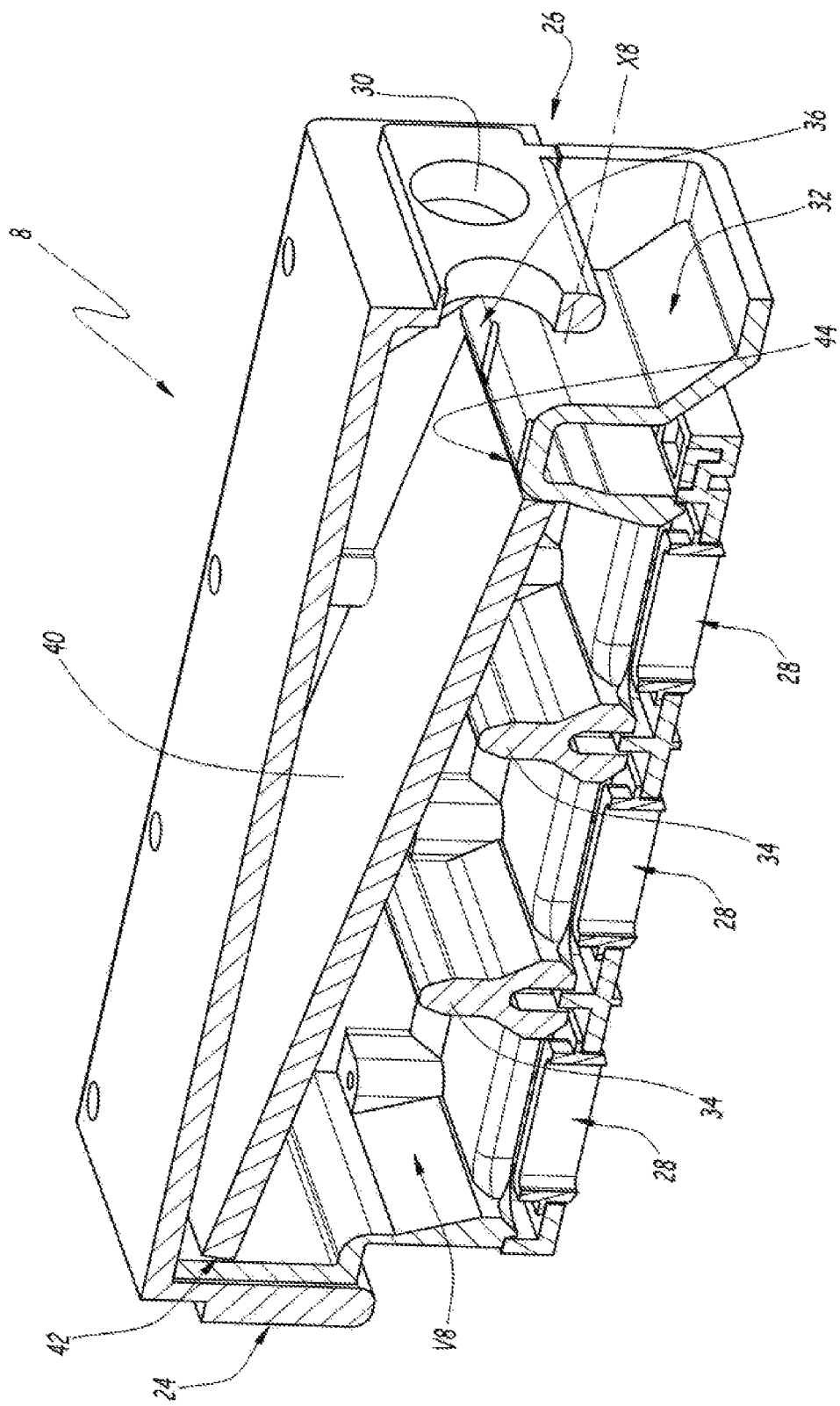
FIG. 4 is a schematic representation of the filtering device of FIG. 2 in a view in section.

An exemplary filtering device 8 is depicted in FIGS. 2, 3 and 4.

The filtering device 8 comprises a hollow body delimited by exterior walls.

For example, the body is made from an electrically insulating material, such as a thermosetting plastic.

In the example illustrated, the reference X8 represents a longitudinal axis of the filtering device 8.

According to examples, the filtering device 8 has an elongate shape extending substantially along the longitudinal axis X8.

For example, the filtering device 8 may have a substantially rectangular shape, as in the example illustrated, or else, according to one variant among others, may have a substantially cylindrical shape.

In the example illustrated, the filtering device 8 comprises an upper region 20 and a lower region 22, as well as a first lateral end region 24 and a second lateral end region 26 facing one another along the longitudinal axis X8.

In the cases where the filtering device 8 has a rectangular shape, or a more generally rectilinear shape, said regions 20, 22, 24 and 26 may be in the form of substantially planar faces. In the example illustrated, the lateral faces 24 and 26 are perpendicular to the longitudinal axis X8.

The filtering device 8 comprises a plurality of inlet openings 28 situated in the lower region 22.

Each inlet opening 28 is configured to collaborate fluidically with one of said discharge orifices 10 formed in the casing 4 of the unit 2, in particular to allow the extinguishing gases exiting from the discharge orifices 10 to enter the filtering device 8.

It is understood that the number of inlet openings 28 is adapted depending on the number of discharge orifices 10 and therefore depending on the number of poles of the unit 2. In the example illustrated, the filtering device 8 comprises three inlet openings 28, each intended to be associated with one of the discharge orifices 10.

By "associated" what is meant here is that an inlet opening 28 is aligned and in contact with a discharge orifice 10 in order to allow the ingress of the extinguishing gas into the filtering device 8 while limiting leaks of gas to outside the casing 4 and the filtering device 8.

Preferably, when the filtering device 8 is associated with the casing 4, the lower region 22 is turned toward the upper part of the casing 4 in which the discharge orifices 10 are located. The inlet openings 28 are aligned with the discharge orifices 10, or even preferentially in contact with the discharge orifices 10.

Advantageously, the dimensions of the inlet openings 28 are similar to the dimensions of the discharge orifices 10.

The filtering device 8 also comprises an outlet opening 36 placed on one of the lateral regions, for example on the second lateral region 26.

This outlet opening 36 is in fluidic communication with the inlet openings 28 via a common internal chamber of the filtering device 8, bearing the reference V8 in FIG. 4. For example, the chamber V8 is delimited by the walls of the body of the filtering device 8.

Preferably, the filtering device 8 is configured so that the extinguishing gases, once they have entered the filtering device 8, may exit therefrom only via the outlet opening 36. In particular, the other lateral region 24 is preferably free of outlet openings.

According to advantageous embodiments, the ratio between, on the one hand, the section of the outlet opening 36 and, on the other hand, the total section of the inlet openings 28 is greater than or equal to 0.5 or advantageously greater than or equal to 1.

According to examples, the outlet opening 36 may be divided into a plurality of orifices with different shapes, dimensions or locations.

In the example illustrated in FIG. 4, the outlet opening 36 is extended by a portion of the body of the filtering device 8 which comprises two circular orifices 30 and a main orifice 32 of rectangular section. For example, the orifices 30 are located in the extension of the outlet opening 36. The orifice 32 is situated below the orifices 30, at the end of a bent portion starting at the filtering device 8. This configuration is not necessarily limiting and, as a variant, other configurations may be used.

Optionally, the inlet openings 28 may be separated pairwise by low walls 34 which project into the chamber V8 from the wall of the body in which the openings 28 are formed. However, these low walls 34 do not extend as far as the wall of the upper region 20 so as not to completely isolate one or more of the openings 28 from the rest of the chamber V8. Here again other configurations are possible. The low walls 34 may even be omitted.

The filtering device 8 further comprises a filter 40 located inside the internal chamber between the inlet openings 28 and the outlet opening 36.

In particular, the filter 40 preferably occupies all of the longitudinal section of the chamber V8, so that the extinguishing gas entering via the openings 28 must pass through the filter 40 in order to reach the outlet opening 36.

Preferably, the filter 40 has a planar shape.

According to embodiments, the filter 40 is inclined inside the chamber V8.

For example, the filter 40 comprises a first longitudinal end 42 and a second longitudinal end 44 between which the filter 40 extends longitudinally. The first end 42 is in contact with an internal wall of the lateral region 24. The second end 44 comes into contact with an internal wall of the opposite lateral region 26 below the outlet opening 36. The end 42 is higher than the end 44. As a variant, the second end 44 may be laid on the lower part of the outlet opening 36.

In other words, the filter 40 extends substantially along the longitudinal axis X8 while sloping downward from the lateral region 24 to the lateral region 26.

For example, the angle of inclination of the filter 40 relative to a horizontal plane is greater than or equal to 15° and preferably greater than or equal to 25°.

In the example illustrated, the longitudinal axis X8 is aligned horizontally.

Preferably, the low walls 34 do not extend as far as the filter 40 and are not in contact with the filter 40, so as to allow an exchange of gas between the different volumes emerging from each opening 28. In other words, the upper end of the low walls 34 is kept at a non-zero distance from the lower face of the filter 40, as is clearly visible in FIG. 4.

Other configurations, in which the low walls 34 may be in contact with the filter 40, are however possible.

According to embodiments, the filter 40 comprises a stack of planar or substantially planar layers.

Preferably, the filter 40 is made from a filtering material such as a porous material or a woven metal web or a metal foam, or any other suitable material. For example, the woven metal webs are metal fabrics of reps type. The metal foam may be a nickel foam.

When the filter 40 comprises several superposed layers, said layers may be made from any one of these materials. Such layers preferentially have a substantially equal surface area.

According to a particular example given by way of not necessarily limiting example, the filter 40 comprises a woven metal web associated with a layer of metal foam made from nickel. The thickness of the layer of metal foam may be between 0.3 mm and 1 cm and for example equal to 5 mm.

According to exemplary embodiments, the filter 40 may be fixed to internal walls of the filtering device 8 or to grooves in the filtering device 8, whether by gluing, by welding, or by means of fixing devices such as screws, bolts, or rivets.

According to optional examples, the filtering device 8 may comprise fixing devices, not illustrated, for securing the filtering device to the casing 4 of the unit 2. For example, the fixing devices may include one or more hooks, such as deformable hooks or tilting hooks, or one or more fixing devices such as screws or bolts.

Such fixing elements may be omitted when the circuit breaker 2 is unpluggable and the filtering device 8 is mounted on the chassis 6, since the filtering device 8 then does not need to be mounted on the casing 4.

By virtue of the various aspects of the invention, the performance of the filtering device 8 is improved with respect to the known units in which filters are embedded directly into the casing of the unit and which are each associated with a single arc extinguishing chamber.

In particular, by virtue of the chamber V8, the pressure of the extinguishing gases exiting from the discharge orifices 10 is better balanced before said gases pass through the filter 40. The filtering device 8 then tends to better resist the extinguishing gas pressure wave when the extinguishing gases exit from the discharge orifices 10.

Incidentally, due to this ability to absorb the pressure wave, the join between the casing 4 and the filtering device 8 may be created simply, without necessarily requiring complex fixing means aimed at establishing a perfect seal between the discharge orifices 10 and the inlet openings 28.

The location of the filter 40 in the chamber V8, and the lateral location of the outlet opening 36, extend the path followed by the gas streams and improve the effectiveness of the filter 40.

The lateral location of the outlet opening 36 also makes it possible to orientate the exiting gas stream toward a specific area of the surroundings of the unit, in particular in order to avoid this gas stream striking neighbouring units adjoining the switching unit in an uncontrolled manner.

The internal construction of the filtering device 8 is facilitated in particular by the fact that it is located outside the casing 4 of the unit 2.

The embodiments and the variants contemplated above may be combined with one another so as to create new embodiments.

The invention claimed is:

1. An electric switching unit comprising a casing and a plurality of arc extinguishing chambers formed inside the casing, each arc extinguishing chamber comprising a gas discharge orifice opening to outside the casing, the electric switching unit comprises a filtering device positioned outside the casing and comprising:

a plurality of inlet openings placed on a lower region of the filtering device opposite an upper region of the filtering device, each inlet opening being configured to collaborate fluidically with one of said gas discharge orifices;

an outlet opening placed on a lateral region of the filtering device;

a common internal chamber which places the plurality of inlet openings in fluidic communication with the outlet opening; and a filter located inside the common internal chamber between the inlet openings and the outlet opening, wherein the filter has a planar shape and is inclined inside the common internal chamber.

2. The electric switching unit according to claim 1, wherein the filter extends longitudinally from a first end in contact with a first lateral region of the filtering device to a second end in contact with the lateral region in which the outlet opening is formed, the second end being located below the outlet opening.

3. The electric switching unit according to claim 1, wherein an angle of inclination of the filter is greater than or equal to 15°.

4. The electric switching unit according to claim 1, wherein the filter comprises one or more layers of a filtering material.

5. The electric switching unit according to claim 4, wherein the filtering material is one of a porous material, a woven metal web or a metal foam.

6. The electric switching unit according to claim 1, wherein a ratio between an area of the outlet opening and a total area of the plurality of inlet openings, is greater than or equal to 0.5.

7. The electric switching unit according to claim 6, wherein the ratio is greater than or equal to 1.

8. The electric switching unit according to claim 1, wherein the filtering device comprises fixing devices for securing the filtering device to the casing of the electric switching unit.

9. The electric switching unit according to claim 1, wherein the electric switching unit comprises a chassis delimiting a receiving volume into which the casing is removably inserted, and wherein the filtering device is fixed to the chassis facing the receiving volume.

10. The electric switching unit according to claim 1, wherein the filtering device has an elongate shape extending substantially along a longitudinal axis.

11. The electric switching unit according to claim 10, wherein the elongate shape is one of a substantially rectangular shape or a substantially cylindrical shape.

12. The electric switching unit according to claim 1, wherein the filtering device comprises a body made from an electrically insulating material.

13. An electric switching unit comprising a casing and a plurality of arc extinguishing chambers formed inside the casing, each arc extinguishing chamber comprising a gas discharge orifice opening to outside the casing, the electric switching unit comprises a filtering device positioned outside the casing and comprising:

a plurality of inlet openings placed on a lower region of the filtering device opposite an upper region of the filtering device, each inlet opening being configured to collaborate fluidically with one of said gas discharge orifices;

an outlet opening placed on a lateral region of the filtering device;

a common internal chamber which places the plurality of inlet openings in fluidic communication with the outlet opening; and a filter located inside the common internal chamber between the inlet openings and the outlet opening, wherein a ratio between an area of the outlet opening and a total area of the plurality of inlet openings, is greater than or equal to 0.5.

14. The electric switching unit according to claim 13, wherein the ratio is greater than or equal to 1.

15. The electric switching unit according to claim 13, wherein the filter is inclined inside the common internal chamber.

16. The electric switching unit according to claim 15, wherein the filter extends longitudinally from a first end in contact with a first lateral region of the filtering device to a second end in contact with the lateral region in which the outlet opening is formed, the second end being located below the outlet opening.

17. The electric switching unit according to claim 15, wherein an angle of inclination of the filter is greater than or equal to 15°.

18. The electric switching unit according to claim 13, wherein the filtering device has an elongate shape extending substantially along a longitudinal axis.

19. The electric switching unit according to claim 18, wherein the elongate shape is one of a substantially rectangular shape or a substantially cylindrical shape.

* * * * *